(12) United States Patent
Bufe et al.

(10) Patent No.: US 9,898,170 B2
(45) Date of Patent: Feb. 20, 2018

(54) ESTABLISHING USER SPECIFIED INTERACTION MODES IN A QUESTION ANSWERING DIALOGUE

(71) Applicant: International Business Machines Corporation, Armonk, NY (US)

(72) Inventors: John P. Bufe, Washington, DC (US); Donna K. Byron, Petersham, MA (US); Mary D. Swift, Rochester, NY (US); Timothy Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 14/566,200

(22) Filed: Dec. 10, 2014

(65) Prior Publication Data
US 2016/0171119 A1    Jun. 16, 2016

(51) Int. Cl.
*G06F 17/30*  (2006.01)
*G06F 3/0484* (2013.01)
*H04L 29/08*  (2006.01)

(52) U.S. Cl.
CPC ...... *G06F 3/0484* (2013.01); *G06F 17/30867* (2013.01); *G06F 17/30905* (2013.01); *H04L 67/22* (2013.01); *H04L 67/36* (2013.01)

(58) Field of Classification Search
CPC ...... G06F 17/27; G06F 17/28; G06F 17/2845; G06F 17/2881; G06F 17/30867; G06F 17/30401; G06F 17/30654; G06F 17/30976
See application file for complete search history.

(56) References Cited

U.S. PATENT DOCUMENTS

| 5,257,185 | A | 10/1993 | Farley et al. |
| 5,752,242 | A | 5/1998 | Havens |
| 6,385,600 | B1 | 5/2002 | McGuinness et al. |
| 6,901,394 | B2 | 5/2005 | Chauhan et al. |
| 6,964,023 | B2 * | 11/2005 | Maes ............... G06F 3/0481 704/E15.041 |
| 7,337,158 | B2 | 2/2008 | Fratkina et al. |

(Continued)

FOREIGN PATENT DOCUMENTS

| CA | 2541024 A1 | 9/2006 |
| EP | 1705554 A2 | 9/2006 |

OTHER PUBLICATIONS

List of IBM Patents or Applications Treated as Related.
(Continued)

*Primary Examiner* — Ryan Pitaro
(74) *Attorney, Agent, or Firm* — Terrile, Cannatti, Chambers & Holland, LLP; Michael Rocco Cannatti

(57) ABSTRACT

An approach is provided for automatically generating user-specific interaction modes for processing question and answers at the information handling system by receiving a question from a user, extracting user context parameters identifying a usage scenario for the user, identifying first input and output presentation modes for the user based on the extracted user context parameters, monitoring user interaction with the system in relation to the question, and adjusting the first input and output presentation modes based on the extracted user context parameters and detected user interaction with the system.

11 Claims, 3 Drawing Sheets

(56) References Cited

U.S. PATENT DOCUMENTS

| | | | |
|---|---|---|---|
| 7,920,682 B2* | 4/2011 | Byrne | H04M 1/645 |
| | | | 345/473 |
| 8,027,945 B1 | 9/2011 | Elad et al. | |
| 8,275,803 B2 | 9/2012 | Brown et al. | |
| 8,311,973 B1* | 11/2012 | Zadeh | G06N 7/02 |
| | | | 706/62 |
| 8,515,888 B2 | 8/2013 | Ventilla et al. | |
| 8,745,493 B2 | 6/2014 | McKirchy | |
| 8,903,845 B2* | 12/2014 | Feild | G06F 17/30867 |
| | | | 707/768 |
| 2002/0133355 A1 | 9/2002 | Ross et al. | |
| 2006/0041555 A1* | 2/2006 | Blessin | G06F 21/6227 |
| 2007/0132860 A1* | 6/2007 | Prabhu | H04N 5/232 |
| | | | 348/231.3 |
| 2008/0148150 A1* | 6/2008 | Mall | G06F 3/048 |
| | | | 715/707 |
| 2008/0294637 A1 | 11/2008 | Liu | |
| 2011/0295590 A1* | 12/2011 | Lloyd | G10L 15/065 |
| | | | 704/8 |
| 2013/0017523 A1* | 1/2013 | Barborak | G09B 7/04 |
| | | | 434/322 |
| 2013/0031476 A1* | 1/2013 | Coin | G06F 17/30976 |
| | | | 715/706 |
| 2013/0059283 A1* | 3/2013 | Nagaoka | G06F 19/363 |
| | | | 434/362 |
| 2013/0157245 A1 | 6/2013 | Basu et al. | |
| 2013/0262501 A1* | 10/2013 | Kuchmann-Beauger | |
| | | | G06F 17/30958 |
| | | | 707/769 |
| 2014/0046694 A1* | 2/2014 | White | G06Q 50/24 |
| | | | 705/3 |
| 2014/0090081 A1* | 3/2014 | Mattsson | G06F 21/6218 |
| | | | 726/27 |
| 2014/0189829 A1* | 7/2014 | McLachlan | G06Q 20/4014 |
| | | | 726/6 |
| 2014/0220540 A1* | 8/2014 | Burgin | G09B 7/00 |
| | | | 434/362 |
| 2014/0250145 A1* | 9/2014 | Jones | G06Q 10/101 |
| | | | 707/769 |
| 2014/0278363 A1* | 9/2014 | Allen | G06F 17/2785 |
| | | | 704/9 |
| 2014/0316768 A1* | 10/2014 | Khandekar | G06F 17/30654 |
| | | | 704/9 |
| 2015/0347900 A1* | 12/2015 | Bell | G06N 5/02 |
| | | | 706/11 |
| 2015/0356579 A1* | 12/2015 | Brondstetter | G06Q 30/0282 |
| | | | 705/7.32 |
| 2016/0203002 A1* | 7/2016 | Kannan | G06F 9/4446 |
| | | | 715/708 |
| 2017/0124183 A1* | 5/2017 | Braham | G06F 17/30675 |

OTHER PUBLICATIONS

B. Peintner et al., Preferences in Interactive Systems: Technical Challenges and Case Studies, Association for the Advancement of Artificial Intelligence, Al Magazine, Winter 2008, 13 pages.
W. Zadrozny et al., Natural language dialogue for personalized interaction, Communications of the ACM 43.8 (2000): 116-120.
R. High, "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true &isnumber=6177717.
S. Quarteroni, Personalized Question Answering, TAL. vol. 51, No. Jan. 2010, pp. 97-123.

* cited by examiner

ESTABLISHING USER SPECIFIED INTERACTION MODES IN A QUESTION ANSWERING DIALOGUE

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. In operation, users submit one or more questions through a front-end application user interface (UI) or application programming interface (API) to the QA system where the questions are processed to generate answers or responses that are returned to the user(s). The QA system generates multiple hypothesis in the form of answers and associated confidence measures and supporting evidence by applying a natural language process to an ingested knowledge base (also known as the corpus) which can come from a variety of sources, including publicly available information and/or proprietary information stored on one or more servers, Internet forums, message boards, or other online or networked information sources. However, the quality of the answer to an individual user depends in part on what specific information and/or answer format that user is seeking. With traditional QA systems, there is only one mode or presentation style for presenting an answer or system output, even if presentation styles vary across different systems. For example, existing QA systems (e.g., Google search results) retrieve and present information results for browsing, but offer a single interface mode which is the same for all users. As a result, a conventional QA system will typically provide a single-pass user interface whereby a user asks a question, and the QA system provides an answer using the default presentation style. While this is sufficient for some users, there will be other users who may desire additional (or less) information than is provided with the answer/response using the default presentation style. As a result, the existing solutions for processing questions and answers provide no opportunity for the user to control or influence the interaction with such QA systems so that individualized solutions for efficiently presenting answer responses are extremely difficult at a practical level.

SUMMARY

Broadly speaking, selected embodiments of the present disclosure provide a system, method, and apparatus for processing of user inquiries to an information handling system capable of answering questions by using the cognitive power of the information handling system to adjust the user interface interaction based on user context and detected dialog state information between the user and the information handling system. In selected embodiments, the information handling system may be embodied as a question answering (QA) system which receives and answers one or more questions from one or more users. To answer a question, the QA system has access to structured, semi-structured, and/or unstructured content contained or stored in one or more large knowledge databases (a.k.a., "corpus"). To improve the quality of answers provided by the QA system, a user interface adjustment engine may be configured to extract user context information (e.g., user ID, user group, user name, age, gender, date, time, location, input or output device type, mode, name, or IP address, topic) associated with a submitted question, and to associate the extracted user context information with a first user interface interaction mode having specified question assistance and answer granularity options. In addition, the user interface adjustment engine may be configured to initially process user interactions (e.g., provide answers or responses) to a user using the first user interface interaction mode. For example, the first user interface interaction mode may specify a question format with question assistance settings which are activated, including question clarification, question completion, spell correction, and disambiguation, and may also include a specified answer format in which short, individual factoid answers are presented. Based on manually set UI presentation mode preferences and/or detected dialog state information generated from additional interactions between the user and the information handling system, the user interface adjustment engine may be configured to adjust or modify the user interface interaction mode so that user interactions are processed using a second, different user interface interaction mode. For example, the second user interface interaction mode may specify an answer format in which longer, passage-like answers or larger information spaces are presented, and may also include one or more specified question assistance settings which are deactivated, including question clarification, question completion, spell correction, and disambiguation. Under control of the user interface adjustment engine which is continuously applied to detect the user context and dialog state information, the user interface interaction modes may be differentiated across different users to continuously assist the user with search and discovery by providing an individualized user interface to each user with tailored follow-up actions to better accomplish the actual goals for each user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
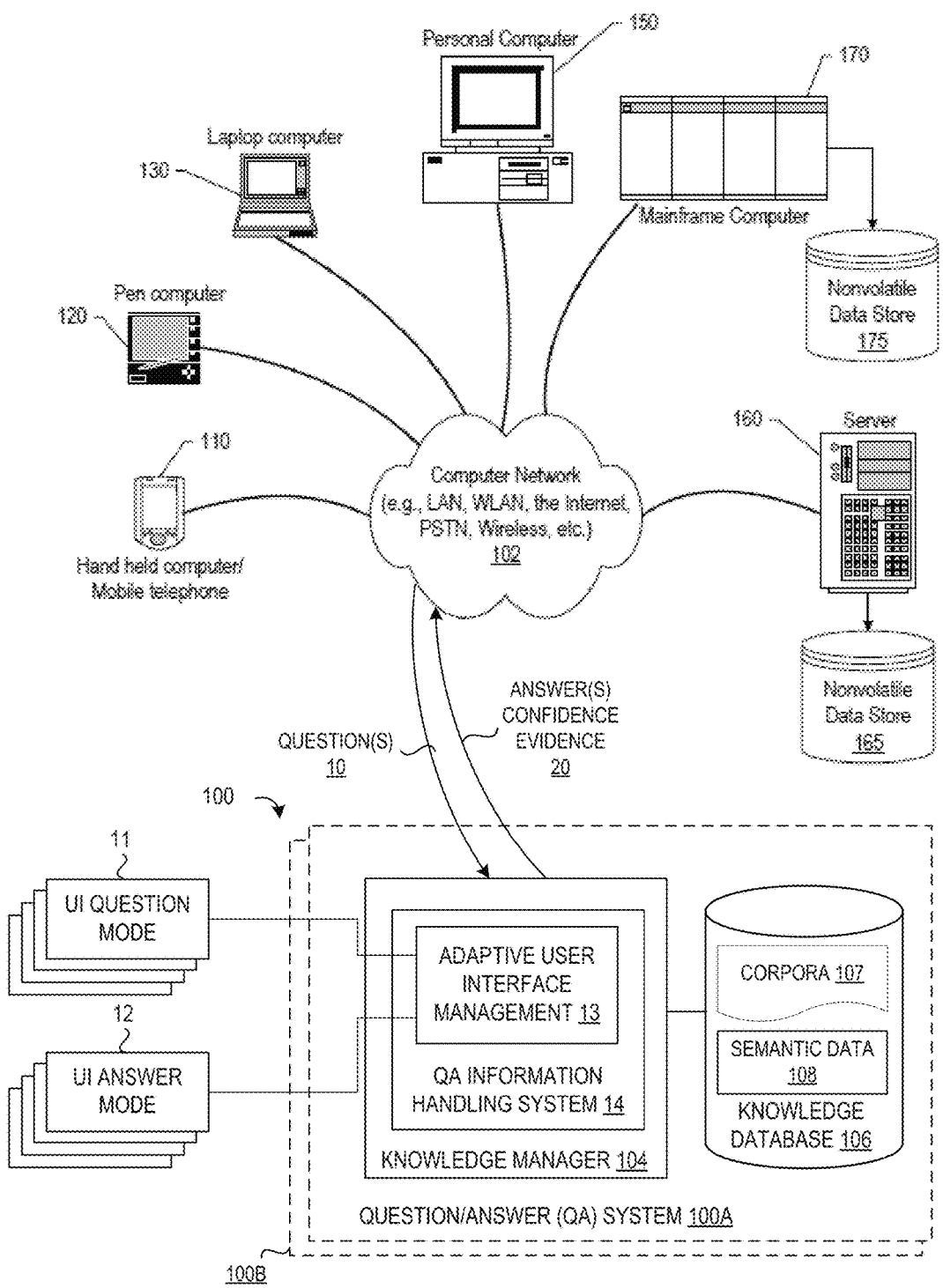
FIG. 1 depicts a network environment that includes a knowledge manager that uses a knowledge base and adaptive user interface management for modifying the user interface interaction mode based on detected user context and dialog state information.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java. Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 100 connected to a computer network 102. The QA system 100 may include one or more QA system pipelines 100A, 100B, each of which includes a knowledge manager computing device 104 (comprising one or more processors and one or more memories, and potentially any other computing device elements generally known in the art including buses, storage devices, communication interfaces, and the like) for processing questions received over the network 102 from one or more users at computing devices (e.g., 110, 120, 130). Over the network 102, the computing devices communicate with each other and with other devices or components via one or more wired and/or wireless data communication links, where each communication link may comprise one or more of wires, routers, switches, transmitters, receivers, or the like. In this networked arrangement, the QA system 100 and network 102 may enable question/answer (QA) generation functionality for one or more content users. Other embodiments of QA system 100 may be used with components, systems, sub-systems, and/or devices other than those that are depicted herein.

In the QA system 100, the knowledge manager 104 may be configured to receive inputs from various sources. For example, knowledge manager 104 may receive input from the network 102, one or more knowledge bases or corpora of electronic documents 106 or other data, a content creator 108, content users, and other possible sources of input. In selected embodiments, the knowledge base 106 may include structured, semi-structured, and/or unstructured content in a plurality of documents that are contained in one or more large knowledge databases or corpora. The various computing devices (e.g., 110, 120, 130) on the network 102 may include access points for content creators and content users. Some of the computing devices may include devices for a database storing the corpus of data as the body of information used by the knowledge manager 104 to generate answers to cases. The network 102 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, the content creator creates content in an electronic document for use as part of a corpora of data 107 with knowledge manager 104. Content may also be created and hosted as a document in one or more remote databases 165, 175 separately from the QA system 100A. Wherever stored, the corpora may include any structured and unstructured documents, including but not limited to any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data. As further described below, when a process evaluates a given section of a document for semantic content 108, the process can use a variety of conventions to query it from the knowledge manager. One convention is to send a well-formed question 10. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 10 (e.g., natural language questions, etc.) to the knowledge manager 104. Knowledge manager 104 may interpret the question and provide a response to the content user containing one or more answers 20 to the question 10. In some embodiments, knowledge manager 104 may provide a response to users in a ranked list of answers 20.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question 10 which it then parses to extract the major features of the question, that in turn are used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 100 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In addition to providing answers to questions, QA system 100 may embody an adaptive user interface management engine or module 13 within the knowledge manager 104 which processes user inquiries to adjust the user interface interaction based on detected user context and dialog state information. To improve the quality of answers provided by the QA system 100, the adaptive user interface management engine/module 13 may be embodied as part of a QA information handling system 14 in the knowledge manager 104, or as a separate information handling system, to extract user context information (e.g., user ID, user group, user name, age, gender, date, time, location, input or output device type, mode, name, or IP address, topic) associated with a submitted user/question, and to associate the extracted user context information with a first or default user interface question mode 11 having specified question assistance options. In addition or in the alternative, the embodied adaptive user interface management engine/module 13 may associate the extracted user context information with a first or default user interface answer mode 12 having specified answer granularity options. An example default user interface question mode 11 may specify a plurality of system input interaction controls to facilitate user input, including, but not limited to, "Did you mean" assistance, question completion assistance, automatic spell correction, "always on" listening mode, disambiguation assistance, and the like. In addition, the default user interface question mode 11 may include one or more actionable user feedback tools to collect user feedback about desired presentation modes, including but not limited to natural language corrections to what the system showed, click-through frequencies for various presentation styles, and other UI controls that can be designed for actionable presentation. Based on user responses collected over time through actionable feedback about the desired user interface presentation mode, the adaptive user interface management engine/module 13 may be configured to adjust or modify the first or default user interface answer mode 12, starting with a UI presentation mode that is designed to satisfy the average user, and then becoming more personalized over time as the adaptive user interface management engine/module 13 has more interaction with a specific user. In this way, the adaptive user interface management engine/module 13 processes a user's first interaction to detect a user context (e.g., on a computer, on a mobile device, while moving, etc.) and assign a default input and output mode 11, 12 for the initial question/answer interaction. However, the adaptive user interface management engine/module 13 also processes user interactions to manually or automatically tune or adjust the input/output modes 11, 12 as the user interacts with the system. As indicated with the cascaded UI question modes 11 and cascaded UI answer modes 12, the modified input/output modes 11, 12 may by selected from a plurality of existing, predefined UI input and/or output modes 11, 12, or may be generated by modifying or adjusting one or more specified question assistance settings or specified answer granularity options in the default input/output modes 11, 12.

To initiate processing, each received question 10 may first be routed through an intelligent question routing process which directs the question 10 to the correct processing function or module within the knowledge manager 104. For example, the QA information handling system 14 in the knowledge manager 104 may process the question 10 with an extraction process, such as a semantic analysis tool or automatic authorship profiling tool, to extract user context information (e.g., user ID, user group, user name, age, gender, date, time, location, input or output device type, mode, name, or IP address, topic) associated with the user that submitted the question 10. The extracted user context information may be used to categorize the usage scenario in terms of input device (e.g., mobile v. tablet v. desktop/laptop), input modality (e.g., voice v. keyboard v. touchpad), position and movement (e.g., home v. on the road v. at the office), and/or user attributes (e.g., age or experience with the system). The QA information handling system 14 may also use natural language (NL) processing to analyze textual information in the question and retrieved information from the knowledge database 106 in order to extract or deduce question context information related thereto, and to determine if the submitted question or topic has sufficient supporting content and training in the knowledge database 106. If the received question 10 is understood and is directed to a topic having sufficient supporting content and training, the QA information handling system 14 may use NLP processing to analyze textual information in the question and retrieve responsive information from the knowledge database 106, where "NLP" refers to the field of computer science, artificial intelligence, and linguistics concerned with the interactions between computers and human (natural) languages. In this context, NLP is related to the area of human-to-computer interaction and natural language understanding by computer systems that enable computer systems to derive meaning from human or natural language input.

To process the received question 10, the adaptive user interface management processing function or module 13 which may use NL processing to select an initial or default user interface question mode. To this end, the adaptive user interface management processing function/module 13 may be configured to select a first user interface question mode 11 which includes specified question assistance settings which are activated, including but not limited to question clarification, question completion, spell correction, and disambiguation. In addition, a first user interface answer mode 12 may be selected by the adaptive user interface management processing function/module 13 which includes specified answer settings which are activated, including but not limited to, a cache lookup mode, a "short" or "long" format answer mode, a channel bandwidth setting, an "audio mode" setting, a "display mode" setting, a search hit web link listing setting, and/or user feedback tool settings. To improve the quality of answers provided by the QA system 100, the adaptive user interface management processing function/module 13 may be configured to continually or periodically monitor user feedback to detect dialog state information between the user and the QA information handling system 14. Over time, the adaptive user interface management processing function/module 13 is trained through user feedback to choose UI question and answer modes for particular question types and/or users, starting with a presentation intended to satisfy the average user and becoming more personalized over time as the QA information handling system 14 has more interaction with a specific user.

Types of information handling systems that can use the QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
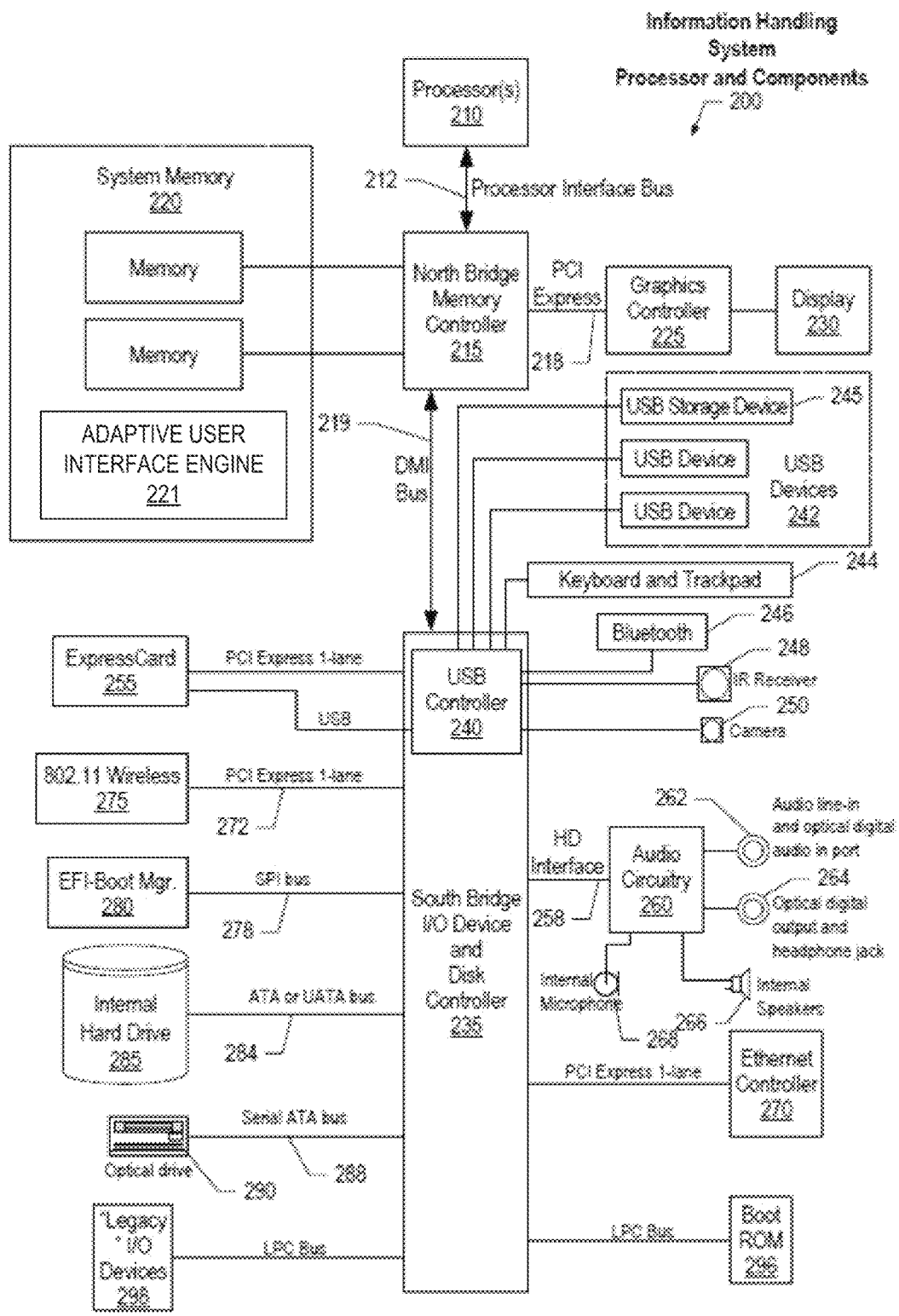
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including an adaptive user interface engine module 221 which may be invoked to process user interactions to adjust the user interface interaction based on user context and detected dialog state information between the user and the information handling system. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
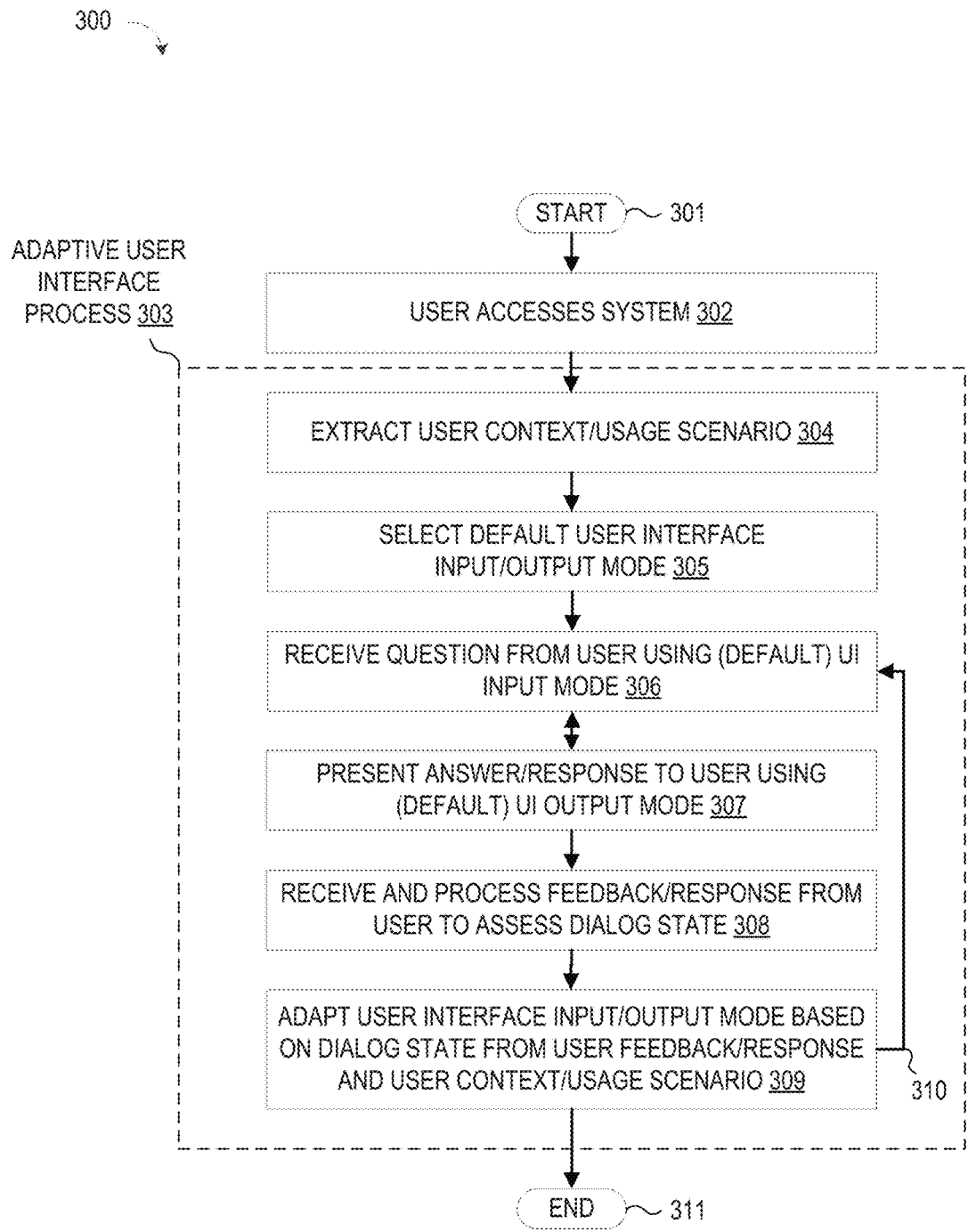
FIG. 3 illustrates a simplified flow chart showing the logic for modifying the user interface interaction mode based on detected user context and dialog state information.

To provide additional details for an improved understanding of selected embodiments of the present disclosure, reference is now made to FIG. 3 which depicts a simplified flow chart 300 showing the logic for modifying the user interface interaction mode based on detected user context and dialog state information. The processing shown in FIG. 3 may be performed in whole or in part by a cognitive system, such as the adaptive user interface management engine or module 13 embodied in a cognitive system 100, such as an IBM Watson™ QA system or other natural language question answering system, which modifies the user interface interaction mode for an individual user to provide an individualized user interface with tailored follow-up actions to better accomplish the actual user goals based on detected the user context and dialog state information.

FIG. 3 processing commences at 301 whereupon, at step 302, a user accesses a system, such as by registering, logging in, or otherwise sending an access or search request to a system. Step 302 may be performed at the QA system 100 or other NLP question answering system as an initial processing step wherein the user access is captured, processed, and stored. The specific access procedures and mechanisms may vary from one system to the next, though the system access may enable detection of the usage scenario associated with the user.

To provide the user with dynamically adapted user interface experience, the QA system 100 or other NLP question answering system may employ an adaptive user interface process 303 which may be continuously or periodically applied to mine user interactions and modify the presentation modes by using different categories of information presentation paired with user feedback tools providing actionable affordances to collect user feedback about desired presentation modes. The range of user feedback tools include natural language corrections to what the system showed, click-through frequencies for various presentation styles, and other UI controls that can be designed for actionable presentation. Over time, the presentation mode chosen for particular question types and/or users is trained by starting with a first or default presentation mode intended to satisfy the average user, and then adapting the first/default presentation mode to become more personalized over time as the system has more interaction with a specific user. For example, when a user first interacts with the system in a given context (on a computer, on a mobile device, while moving, etc.), the user is assigned a default input and output mode with defined preference settings that the system will use for interaction with the user. By monitoring the user's subsequent system interactions and/or manual tuning of the defined preference settings, the system may learn how to modify the input/output modes from the user's interactions so that the user-defined and pre-defined modes can be modified to behave in user-desired ways. By having different interaction settings both for question input and answer output, the user can have a more enriched experience specifically tailored to their knowledge of the system and expected results. In selected embodiments, the question input preferences can define features such as content-assist and cache lookups, and the answer output preferences can define dialogue properties, answer type and presentation, and ability to search and discover additional information.

As a preliminary step in the adaptive user interface process 303, a user context extraction step 304 is performed to extract user context information relating to the usage scenario for the user. The user context extraction processing at step 304 may be performed at the QA system 100 or other NLP question answering system as an initial processing step wherein an extraction process uses a multimodal user interface (UI) or application programming interface (API) to process multimodal input questions 10 to effectively transform the different inputs to a shared or common format for user context extraction processing. At this input stage, the extraction processing at step 304 may be suitably configured to understand or determine the user profile, user ID, user group, user name, age, gender, location (which can be detected using the GPS on their mobile devices or approximation using IP address), date and time information for each of the end users, type of input or output device used to submit a question, and/or device mode (e.g., audio or visual settings), thereby generating user context information for each user. For example, the processing at step 304 may apply a semantic analysis tool or automatic authorship profiling tool to obtain user profile information for the end user accessing the system. In selected example embodiments, the extraction processing at step 304 may generate user context information by leveraging location information of each end user, such as by detecting specific end user location information (e.g., GPS coordinates) based on the end user device capabilities, and/or by detecting approximation-based end user location information (e.g., origination IP address). In other embodiments, the context extraction processing step 304 may identify additional contextual information for each submitted question, such as key terms, focus, lexical answer type (LAT) information, sentiment, synonyms, and/or other specified terms. The user context extraction process 304 may also evaluate the extracted user context information to identify a corresponding usage scenario. For example, the user context extraction process 304 may employ an NLP routine, machine learning tool, artificial intelligence, or other linguistics process to specify a usage scenario in terms of an input device parameter (e.g., mobile v. tablet v. desktop/laptop), input modality parameter (e.g., voice v. keyboard v. touchpad), position and movement parameter (e.g., home v. on the road v. at the office), and/or user attribute parameter (e.g., age or experience with the system). As will be appreciated, other usage parameters may be used to characterize the usage scenario at step 304.

Once the usage scenario parameters are identified, the user interface mode selection process 305 may select a first or default UI interaction mode by mapping a combination of detected usage scenario parameters to an initial or default set of input and output modes, such as a question presentation mode and/or answer presentation mode, that the system will use. Other selection mechanisms may be employed, including but not limited to classifying the extracted usage scenario parameters into a default UI mode, using Bayesian reasoning to make inferences from extracted usage scenario parameters when selecting a default UI mode, and the like. The processing at step 305 may be performed at the QA system 100 or other NLP question answering system and applied to the extracted usage scenario parameters, though any desired information processing system for selecting a UI interaction mode may be used. As described herein, a Natural Language Processing (NLP) routine may be used to process the extracted user context and/or usage scenario parameters to select a UI interaction mode. In this context, NLP is related to the area of human-computer interaction and natural language understanding by computer systems that enable computer systems to derive meaning from human or natural language input. In selected embodiments, a default UI input mode and default UI output mode are selected at step 305 for submitting the initial question and answer responses at the system, where the default UI input and output modes are configured with specified question and answer assistance settings which are set in a "learning mode" in which the user interactions with the system will influence how the system input and output modes behave in the future. For example, the selection processing at step 305 may select a default UI input mode to facilitate question submissions by activating specified question assistance settings which facilitate or ease the user experience, such as question clarification assistance (a.k.a., "did you mean" assistance), question completion assistance, automatic spell correction, listening mode assistance, and/or disambiguation assistance. In addition, the selection processing at step 305 may select a default UI output mode to facilitate answer responses by activating specified answer assistance settings for formatting the system response, such as a cache lookup mode setting, a "short" or "long" format answer mode setting, a channel bandwidth setting, an "audio mode" setting and/or "display mode" setting for specifying the audio/textual/image/video content for the answer, a search hit web link listing setting to display search hits to web links in a way that enables information exploration, a related application setting for launching an application within the answer, and/or user feedback settings to present a variety of "related questions" or "did you mean" options and content assistance features. As will be appreciated, the default UT output mode may be configured to provide a variety of different output presentation modes which can be formatted to return answer responses in a variety of ways.

Using the selected default UI input mode, the user submits a question to the system which is received and processed at step 306 to generate an answer with associated evidence and confidence measures for the end user(s). The reception processing at step 306 may be performed at the QA system 100 or other NLP question answering system, though any desired information processing system for receiving and processing questions and answers may be used. As described herein, a Natural Language Processing (NLP) routine may be used to process the received questions and/or generate a computed answer with associated evidence and confidence measures. In this context, NLP is related to the area of human-computer interaction and natural language understanding by computer systems that enable computer systems to derive meaning from human or natural language input. For example, a received question might ask "Who was John Quincy Adams' Vice President?" or "What should I get my husband for a birthday present?"

At step 307, the answer response to the submitted question is presented to the user using the selected default UI output mode. The presentation processing at step 307 may be performed at the QA system 100 or other NLP question answering system, though any desired information processing system for receiving and processing questions and answers may be used. As will be appreciated, a range of different answers may be provided in response to a question. For example, correct system responses to the question, "Who was John Quincy Adams' Vice President?" could include a short, factoid answer with the person's name ("John C. Calhoun") or could a broader biographical description of the John Calhoun. The accuracy or correctness of the response will depend on the goal behind the user's question. For example, someone trying to settle a bar bet using a mobile device with a small screen may want only the person's name, while a student researching a term paper will likely want additional information. As another example, there are a variety of correct responses to the question, "What should I get my husband for a birthday present?" some of which may include photos of suggested objects and others which include feature comparison grids.

As shown by the double-sided arrow between step 306 and step 307, more than one question and answer may be submitted using the selected UI input and output modes as part of the user interaction monitoring process. In the initial pass, default UI input and output modes will be used, but as described below, subsequent passes may use modified UI input/output modes to submit questions and answers within the adaptive user interface process 303.

As seen from these example questions and answers, the value or quality of an answer will depend on the user's underlying intention or goal behind the question. The user's end goal is very important in determining whether one or more of these presentation modes are preferred. Unfortunately, the user's end goal cannot readily be ascertained from a straightforward question analysis or by application of conventional artificial intelligence tools. Nor can a question analysis assess whether some or all of the question assistance or answer settings may be helpful, distracting and/or time-consuming to the user. To better assess the user's intention or goals and the usefulness of the question assistance or answer settings, the quantity and modality of the user's interactions with the system may be monitored to help the system learn which question or answer presentation mode is most helpful or desired for a given context. When the user interacts with information presented in a first presentation mode, that interaction is recorded as a success for the particular mode given the usage scenario. In other cases, the user may explicitly correct the system's choice of presentation mode via natural language or UI controls, which case that interaction is recorded as a correction or modification input for the particular mode given the usage scenario.

To track user responses, the selected default UI input and/or output modes may be defined to include one or more actionable user feedback tools which are monitored to detect dialog state information between the user and the information handling system. In particular, once the user responds to the answer response by activating one of the user feedback tools, the received user feedback/response may be processed at step 308 to evaluate the user's response to the original answer/response from step 307. The processing at step 308 may be performed at the QA system 100 or other NLP question answering system and applied to the user's response or feedback, though any desired information processing system for processing user feedback or responses may be used. In selected embodiments, a Natural Language Processing (NLP) routine may be used to process the user feedback and/or user responses to evaluate the user's satisfaction with the original answer/response based on user responses to what the system showed, user click-through behavior, follow-up questions from the user, and/or other UI presentation mode indicators. Through the processing of the user's feedback/response at step 308, question and answering dialogue state information is captured that may be used to define the user interaction between the user and the information handling system.

Based on the captured dialog state information, the question and/or answer presentation modes may be modified or changed to better reflect the user's underlying intentions or goals behind the submitted questions. In the adaptive user interface process 303, the presentation modes are adapted or changed at step 309 by changing the user interface input/output mode based on the detected dialog state extracted from the user feedback/response and the detected user context/usage scenario. As described herein, the presentation modes can be adapted or modified manually (e.g., when the user manually changes the preference settings) and/or automatically (e.g., by applying an automated learning algorithm or process which processes user interactions and/or usage scenario information). In either case, the processing at step 309 may be performed at the QA system 100 or other NLP question answering system and applied to adapt or modify the UI input/output mode based the user feedback/response and user context/usage scenario, though any desired information processing system for modifying the user interface input/output mode may be used. In selected embodiments, the processing step 309 uses a learning routine or algorithm to modify or adapt the UI input/output mode based on the identified usage scenario (such as extracted from the user profile) and/or the identified dialog state information (such as captured from the user feedback responses or other interactions with the system). In selected embodiments, the processing at step 309 may apply a collaborative filtering tool or algorithm that filters for information or patterns by collaborating among multiple agents, viewpoints, data sources, etc., to make automatic associations (filtering) between questions and/or answer for different end users (collaborating), thereby predicting a preferred input or output mode based on one or more features of the usage scenario. For example, the collaborative filtering may be applied to examine user profile features extracted for a particular user when assessing whether the user has any distinct or unique property that would indicate selecting a different information mode for the presentation. In addition or in the alternative, the collaborative filtering applied at step 309 may be applied to examine the dialog state between the user and system—such as user feedback (e.g., "like" or "dislike" answer ratings for the presentation mode that the user received) or other user interaction—when assessing whether the system dialog state indicates selecting a different presentation mode for the user.

In adapting the input/output presentation mode, the process step 309 may use the dialog state information from user interactions, along with usage scenario information from user context or profile information, to assess the informational sufficiency of different presentation styles in terms of satisfying the user's goal or intention behind the question. For example, user interactions with the default UI output mode can be analyzed to determine whether the user simply wants to know a fact or purchase something or read a web page about a historical event. In each of these cases, the optimal presentation of information will be different, and can be detected by monitoring the dialog state and/or usage scenario so that the UI input/output mode will be modified accordingly. In addition, user context or profile information can be analyzed to determine a usage scenario, such as the type of interface/communication channel being used. In the case of a communication channel to a mobile device, the optimal presentation of information will use a smaller, more condensed information presentation as compared to a broadband channel to a desktop computer with a large screen for text/visual presentation, and the UI input/output mode will be modified accordingly. In similar fashion, if the detected usage scenario is for a device with only an audio channel open, the UI input/output mode may be modified to account for this usage.

In selected embodiments, the adaptation of the input/output presentation mode at process step 309 may be implemented by selecting between user-defined and/or predefined UI presentation modes to allow the QA system to behave in user-desired ways. By configuring predefined UI presentation modes with different interaction settings both for question input and retrieval and then selecting a desired UI presentation mode at the adaptation step 309, the user can have a more enriched experience specifically tailored to their knowledge of the system and expected results. For example, the predefined UI input (or question) presentation modes may be variously configured with input preferences to define question assistance settings, such as question clarification, question completion, spell correction, and disambiguation. Likewise, the predefined UI output (or answer) presentation modes may be variously configured with output preferences to define answer features and/or related dialog properties, such as a cache lookup mode, answer type and presentation, the ability to search and discover additional information or open related applications.

After modifying the UI input/output mode at step 309, the process ends at step 311, at which point the adaptive user interface process 303 may await reactivation according to a predetermined or periodic activation schedule. Alternatively and as indicated by the feedback line 310 to the processing step 306, the adaptive user interface process 303 may be iteratively applied to a sequence of questions and answers over time to train the UI presentation modes chosen for particular question types or uses, starting with a default UI input/output presentation mode that intended to satisfy the average user, and then becoming more personalized over time as the system has more interaction and/or feedback with a specific user. In contrast, a conventional QA system, such as the Google search engine, offers a static and unchanging UI output mode listing of multiple search result options for possible follow-up action which is the same for all users and which has limited or non-existent user feedback options for indicating which mode was the right one. By iteratively adapting the input/output presentation mode over time, the process step 309 enables differentiation of the UI presentation modes across different user modes to accomplish different and evolving user goals, while providing richer information for follow-up actions to assist the user with search and discovery.

To illustrate how the adaptive user interface process 303 can learn from the user's interactions and user context to modify the UI presentation modes, a first example use case will now be described with reference to a first user using a desktop home computer to submit a question over the Internet. In this first example use case, the extracted user context information resulting from step 304 specifies a first usage scenario in terms of a first set of extracted user context parameters (e.g., Context: desktop browser, keyboard, at home). Based on the extracted user context information, a first default UI input mode selected at step 305 is specified in terms of a first set of default input mode parameters (e.g., Default input mode: automatic spell correction. "did you mean" assistance, question completion, disambiguation assistance, listen-mode off). In addition, the selection processing step 305 specifies a first default UI output mode based on the extracted user context information in terms of a first set of default output mode parameters (e.g., Default output mode: presenting many search hits to web links in a way that enables information exploration, textual and image results). Using the selected default input/output modes, one or more questions and answers are captured and processed at steps 306, 307, thereby collecting user feedback through the captured question and answer interaction. For example, the interaction may include the following sequence of questions: User: "Is United flight 522 on time?"//System: "United Airlines?"//User: "Yes. Of course!"//System: "United Airlines flight 522 will be landing at 7:30 PM."//User: "Yes or no?"//System: "Yes. United Airlines flight 522 is on time. In response to the first question ("Is United flight 522 on time?"), the system may use the disambiguation assistance parameter setting from the first default UI input mode to ask for clarification, "United Airlines?" In response, the user provides confirmation feedback, "Yes. Of course!" In response, the system may use a defined parameter setting from the first default UI output mode to provide a first, expansive response, "United Airlines flight 522 will be landing at 7:30 PM." In response, the user provides negative feedback, "Yes or no?" In response, the system may use a defined parameter setting from the first default UT output mode to provide a second, more focused response, "Yes. United Airlines flight 522 is on time." At step 308, the captured question and answer interaction is processed to assess a dialog state which indicates that the user does not require disambiguation assistance when submitting questions, and also indicates that the user prefers "Yes" or "No" answers when possible. At step 309, this dialog state information is used to adapt the UI input mode to deactivate the disambiguation assistance feature, and to adapt the UI output mode to answer with Yes/No when possible.

To illustrate another example of the adaptive user interface process 303 learning how to modify the UI presentation modes from the user's interactions and user context, a second example use case will now be described with reference to a second user using a mobile device to submit a question using voice commands while driving. In this second example use case, the extracted user context information resulting from step 304 specifies a usage scenario in terms of a second set of extracted user context parameters (e.g., Context: mobile device, using voice commands, while driving). Based on the extracted user context information, a second default UI input mode selected at step 305 is specified in terms of a second set of default input mode parameters (e.g., Default input mode: automatic spell correction, always on listen mode, no disambiguation). In addition, the selection processing step 305 specifies a second default UI output mode based on the extracted user context information in terms of a second set of default output mode parameters (e.g., Default output mode: verbal, short answer). Using the selected default input/output modes, one or more questions and answers are captured and processed at steps 306, 307, thereby collecting user feedback through the captured question and answer interaction. For example, the interaction may include the following sequence of questions: User: "Where is the nearest gas station?"//System: "There is a gas station at 100 Highway 1, Somerville, N.Y."//User: "Can you show it on the map?"//System: <displays map with directions>. In response to the first question ("Where is the nearest gas station?"), the system may use the parameter settings from the second default UI output mode to provide a short, concise verbal description of the location in the answer ("There is a gas station at 100 Highway 1, Somerville, N.Y."), recognizing from the detected context that the user is driving and communicating over a limited channel width ask mobile device. However, in response to the user's feedback response ("Can you show it on the map?"), the system may use a defined parameter setting from the second default UI output mode to display a map with directions to the requested location. At step 308, the captured question and answer interaction is processed to assess a dialog state which indicates that the user wishes to open a map application when requesting location information while driving and using a mobile device. At step 309, this dialog state information is used to adapt the UI output mode to use a map application when answering a question that requests location information while driving and using a mobile device.

To illustrate yet another example of the adaptive user interface process 303 learning how to modify the UI presentation modes from the user's interactions and user context, a third example use case will now be described with reference to a third user who submits a question over the Internet from a desktop home computer. In this third example use case, the extracted user context information resulting from step 304 specifies a usage scenario in terms of a third set of extracted user context parameters (e.g., Context: desktop browser, keyboard, at home). Based on the extracted user context information, a third default UI input mode selected at step 305 is specified in terms of a third set of default input mode parameters (e.g., Default input mode: automatic spell correction, "did you mean" assistance, question completion, disambiguation assistance, listen-mode off). In addition, the selection processing step 305 specifies a third default UI output mode based on the extracted user context information in terms of a second set of default output mode parameters (e.g., Default output mode: presenting many search hits to web links in a way that enables information exploration, textual and image results). Using the selected default input/output modes, one or more questions and answers are captured and processed at steps 306, 307, thereby collecting user feedback through the captured question and answer interaction. For example, the interaction may include the following sequence of questions: User: "What should I buy for my husband on his birthday?"// System: "Here are some links for men's birthday presents: <links>"//User: "Can you show me pictures of the presents?"//System: "Here are some images of men's birthday presents: <images>". In response to the first question ("What should I buy for my husband on his birthday?"), the system may use the parameter settings from the third default UI output mode to provide search results with a listing of web links to enable information exploration ("Here are some links for men's birthday presents: <links>"), recognizing from the detected context that the user allows for computationally intensive user interactions at the home desktop computer environment. However, in response to the user's feedback response ("Can you show me pictures of the presents?"), the system may use a defined parameter setting from the third default UI output mode to display images of the requested information. At step 308, the captured question and answer interaction is processed to assess a dialog state which indicates that the user wishes to be presented with images for any topic relating to purchasing requests. At step 309, this dialog state information is used to adapt the UI output mode to display images as part of the answer or response to a question topic relating to shopping or purchasing.

By now, it will be appreciated that there is disclosed herein a system, method, apparatus, and computer program product for generating user-specific interaction modes for processing question and answers with an information handling system having a processor and a memory. As disclosed, the system, method, apparatus, and computer program product receive a question from a user and extract or identify therefrom a plurality of user context parameters identifying a usage scenario for the user. Examples of user context parameters include, but are not limited to the user's input device type, output device type, input modality, location, and one or more user attributes selected from a group consisting of age, experience, demography, and topic. Based on the extracted user context parameters, the system identifies or selects a first input presentation mode and a first output presentation mode for the user. In selected embodiments, the first input and output presentation modes may be identified by selecting a default input presentation mode having specified question assistance settings and selecting a default output presentation mode having specified answer granularity options. For example, the specified question assistance settings may be selected from a group consisting of a question clarification setting, question completion setting, spell correction setting, and disambiguation assistance setting. In addition, the specified answer granularity options may be selected from a group consisting of an enable exploration setting, a web link setting, a context setting, a precise response setting, a verbose response setting, an alternative response setting, a supporting evidence setting, an image setting, and an application launch setting. As information and responses are exchanged in relation to the question using the first input and output presentation modes, the user interactions are monitored and used to adjust the first input and output presentation modes. For example, the user feedback and responses provided using the first input and output presentation modes may be monitored to assess a dialog state indicating a user's desired presentation mode, such as by detecting natural language corrections by the user to responses provided by the system using the first input and output presentation modes, monitoring user click-through frequencies for responses provided by the system using the first input and output presentation modes, and/or detecting user activation of a user interface control included in the first input and output presentation modes. In selected embodiments, the first input and output presentation modes may be adjusted by modifying one or more of the specified question assistance settings or specified answer granularity options.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory coupled to at least one of the processors;
   a set of instructions stored in the memory and executed by at least one of the processors to generate user-specific interaction modes for processing question and answers, wherein the set of instructions are executable to perform actions of:
   extracting, by the system, a plurality of user context parameters identifying a usage scenario for the user, where the user context parameters are selected from a group consisting of a user ID, user group, user name, age, gender, date, time, location, input or output device type, mode, name, or IP address, and topic associated with a user submitted question;
   identifying, by the system, a first input presentation mode and a first output presentation mode for the user based on the plurality of user context parameters extracted for the user, where the first input presentation mode comprises a default input presentation mode comprising specified question assistance settings to facilitate question submissions that are selected from a group consisting of a question clarification setting, question completion setting, spell correction setting, and disambiguation assistance setting, and where the first output presentation mode comprises a first set of answer assistance settings to facilitate answer responses;
   monitoring, by the system, user interaction with the system to detect dialog state information between the user and the system; and
   adjusting, by the system, the first input and output presentation modes to become modified input and output presentation modes which are personalized over time based on the user interaction with the system.

2. The information handling system of claim 1, wherein extracting the plurality of user context parameters comprises identifying, by the system, the user's input device type, output device type, input modality, location, and one or more user attributes selected from a group consisting of age, experience, demography, and topic.

3. The information handling system of claim 1, wherein identifying the first input and output presentation modes comprises selecting the default input presentation mode comprising specified question assistance settings and selecting a default output presentation mode comprising specified answer granularity options.

4. The information handling system of claim 3, wherein the specified answer granularity options are selected from a group consisting of an enable exploration setting, a web link setting, a context setting, a precise response setting, a verbose response setting, an alternative response setting, a supporting evidence setting, an image setting, and an application launch setting.

5. The information handling system of claim 3, wherein adjusting the first input and output presentation modes comprises modifying one or more of the specified question assistance settings or specified answer granularity options.

6. The information handling system of claim 1, wherein monitoring user interaction with the system comprises monitoring user feedback and responses provided using the first input and output presentation modes to assess a dialog state indicating a user's desired presentation mode.

7. The information handling system of claim 6, wherein monitoring user feedback and responses comprises detecting natural language corrections by the user to responses provided by the system using the first input and output presentation modes, monitoring user click-through frequencies for responses provided by the system using the first input and output presentation modes, and detecting user activation of a user interface control included in the first input and output presentation modes.

8. A computer program product stored in a computer readable storage medium, comprising computer instructions that, when executed by an information handling system, causes the system to generate user-specific interaction modes for processing question and answers by performing actions comprising:
   extracting, by the system, a plurality of user context parameters identifying a usage scenario for the user, where the user context parameters are selected from a group consisting of a user ID, user group, user name, age, gender, date, time, location, input or output device type, mode, name, or IP address, and topic associated with a user submitted question;
   identifying, by the system, a first input presentation mode and a first Output presentation mode for the user based on the plurality of user context parameters extracted for the user, where the first input presentation mode comprises a first set of question assistance settings to facilitate question submissions, and where the first output presentation mode comprises a first set of answer assistance settings to facilitate answer responses;

monitoring user feedback and responses provided using the first input and output presentation modes to assess a dialog state indicating a user's desired presentation mode by detecting natural language corrections by the user to responses provided by the system using the first input and output presentation modes;

monitoring user click-through frequencies for responses provided by the system using the first input and output presentation modes;

detecting user activation of a user interface control included in the first input and output presentation modes; and adjusting, by the system, the first input and output presentation modes to become modified input and output presentation modes which are personalized over time based on the user interaction with the system.

9. The computer program product of claim 8, wherein extracting the plurality of user context parameters comprises identifying, by the system; the user's input device type, output device type, input modality, location, and one or more user attributes selected from a group consisting of age, experience; demography, and topic, and wherein identifying the first input and output presentation modes comprises selecting a default input presentation mode comprising specified question assistance settings and selecting a default output presentation mode comprising specified answer granularity options.

10. The computer program product of claim 9, wherein the specified question assistance settings are selected from a group consisting of a question clarification setting, question completion setting, spell correction setting, and disambiguation assistance setting, and wherein the specified answer granularity options are selected from a group consisting of an enable exploration setting, a web link setting, a context setting, a precise response setting, a verbose response setting, an alternative response setting, a supporting evidence setting, an image setting, and an application launch setting.

11. An information handling system comprising:
one or more processors;
a memory coupled to at least one of the processors;
a set of instructions stored in the memory and executed by at least one of the processors to generate user-specific interaction modes for processing question and answers, wherein the set of instructions are executable to perform actions of:
extracting, by the system, a plurality of user context parameters identifying a usage scenario for the user;
identifying, by the system, a first input presentation mode and a first output presentation mode for the user based on the plurality of user context parameters extracted for the user, where the first input presentation mode comprises a first set of question assistance settings to facilitate question submissions, and where the first output presentation mode comprises a default output presentation mode comprising specified answer granularity options to facilitate answer responses that are selected from a group consisting of an enable exploration setting, a web link setting, a context setting, a precise response setting, a verbose response setting, an alternative response setting, a supporting evidence setting, an image setting, and an application launch setting;
monitoring, by the system, user interaction with the system to detect dialog state information between the user and the system; and
adjusting, by the system, the first input and output presentation modes to become modified input and output presentation modes which are personalized over time based on the user interaction with the system.

* * * * *